Patented Nov. 10, 1942

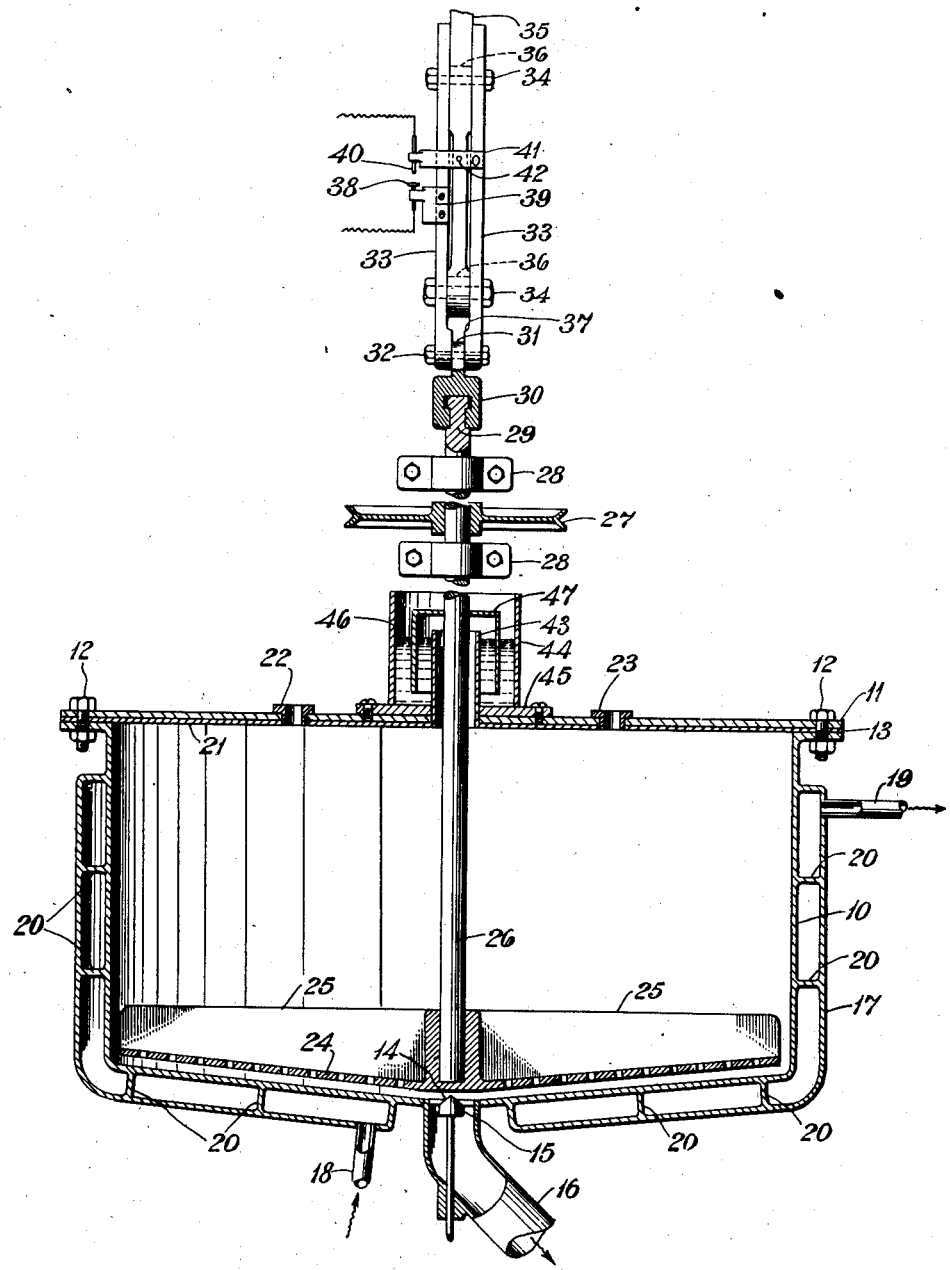

2,301,204

UNITED STATES PATENT OFFICE 2,301,204

APPARATUS FOR POLYMERIZATION PROCESSES

Charles M. Fields and Reuben T. Fields, Arlington, N. J., assignors to E. I. du Pont de Nemours & Company, Wilmington, Del., a corporation of Delaware Application July 28, 1939, Serial No. 286,968

1 Claim. (Cl. 177—311)

This invention relates to an apparatus for polymerization processes and, more particularly, to an improved apparatus for carrying out the partial polymerization of liquid ethenoid monomers to the condition of a viscous syrup.

For the manufacture of certain synthetic ethenoid resins in cast shapes, and for some other purposes, it has been found advantageous to use the starting material in a partially polymerized form rather than in a substantial monomeric form. To this end, the monomeric liquid is heated, either with or without the addition of a polymerization catalyst, to a sufficiently high temperature and for a sufficient length of time to effect a conversion of the mobile monomer into a viscous syrup.

The viscosity of this syrup must be fairly closely controlled, so as to be high enough to obviate convection in certain subsequent operations, such as that disclosed in U. S. Patent 2,057,674, and yet on the other hand low enough so that the syrup can readily be poured, can flow through pipe lines, and can release bubbles of air. Furthermore, adherence to a definite standard of viscosity facilitates the uniform control of subsequent operations of polymerization.

Syrup can be prepared in commercial quantity by effecting polymerization in a large number of small containers, e. g. one gallon jars, maintained at an appropriate temperature, and then combining their contents. But the various individual batches will ordinarily not polymerize at the same rate, and must be individually watched, and the combined product must be blended in order that its viscosity may be uniform.

Polymerization of a large batch in a single container entails difficulty in keeping the rate of reaction within bounds; the reaction of polymerization is an exothermic one, and for this reason there is a strong tendency, in a considerable bulk of material from which it is difficult to extract the heat of reaction, for the reaction to proceed at a rapidly accelerated rate which can not be checked until the polymerization has progressed beyond the desired point. Even a moderate excess of viscosity is troublesome; dilution with monomer, in order to reduce the viscosity to the desired level, is frequently unsatisfactory because of the difficulty of obtaining a homogeneous mixture thereby, and the amount of monomer required may in some cases increase the volume of the batch beyond the capacity of the equipment. In a more extreme case, in which polymerization proceeds still further to the formation of a gel or semi-solid, serious operating delays and damage to equipment will result.

It is an object of the present invention to provide equipment for the partial polymerization of mobile liquid monomers up to the condition of viscous syrups adapted to be drained, poured, pumped, etc., in the furtherance of processes of forming hard resins in cast shapes. More particularly, it is an object of the invention to provide equipment adapted to the polymerization thereof to a predetermined viscosity, and thus to the avoidance of the uncontrolled reaction thereof, in commercial quantities. An important object is to further and simplify the control of the extent of the reaction of polymerization by providing means for signaling, automatically, the attainment of a predetermined viscosity, which means of signaling can, if desired, be caused to actuate controls for the purpose of terminating the reaction.

The above objects are accomplished according to the present invention by an apparatus comprising a reaction vessel, an agitator therein, means of imparting reciprocal motion to said agitator, and a signaling device actuated by resistance of a viscous liquid within said vessel to the reciprocating motion of said agitator.

More specifically, the equipment provided in accordance with a preferred embodiment of the present invention comprises a reaction vessel of circular horizontal cross-section and having vertical walls, a jacket upon the vessel adapted for heating and cooling its contents, an agitator comprising a vertical shaft, a perforated plate conforming to the floor of the vessel, and a plurality of vanes, which plate and vanes have very nearly the full radius of the vessel, means for actuating the agitator in rotational motion, means, comprising a compressible link member, for actuating the agitator in vertical reciprocating motion, and an alarm device adapted to be actuated by the compression of the compressible link member when the resistance of the polymerizable liquid in the vessel to the vertical motion of the agitator is in excess of a predetermined value. The vessel is provided preferably with a vapor-tight cover and with a vapor-tight stuffing box attached thereto for the accommodation of the shaft of the agitator.

A specific embodiment of the apparatus of the present invention is described below, reference being made to the single figure of the accompanying drawing in which is shown a vertical section through the apparatus.

A kettle 10 is provided with a cover 11, which is conveniently fastened to it by bolts 12, 12. The joint between kettle 10 and cover 11 at their periphery 13 is made gas-tight by means of a suitable gasket. The bottom of the kettle 10 is preferably sloped downward to a discharge opening 14 to facilitate the draining of viscous liquid therefrom. This opening 14 is sealed liquid-tight by a valve 15, the opening of which will discharge the liquid contents of the kettle 10 through a discharge pipe 16. The kettle 10 is provided with a jacket 17 for the circulation of hot or cold water as may be required for the control of the process. Preferably, the intake to this jacket is located at its lowest point, as indicated at 18 in the drawing, and its discharge at its highest point, as indicated at 19 in the drawing, and, preferably, the jacket contains a spiral baffle, sections of which are shown at 20, 20 in the drawing, which serves to direct the flow of heating or cooling water in the jacket 17 and to promote the uniformity of its effect.

The interior surface of the kettle 10 and the lower surface of the cover 11 are made of material which will not contaminate the material to be polymerized within the kettle. Conveniently, aluminum is used for the body of the kettle 10, while the cover 11 may be made of steel, faced on its lower surface with a plate 21 of aluminum. The cover 11 is pierced by an opening provided with a bushing 22 which may be fitted with a vent pipe adapted to release any excess gas pressure developed within the kettle and by means of which also the interior of the kettle can, if suitably sealed, be connected with a source of compressed gas in order to facilitate the discharge of a viscous liquid through the bottom opening 14. The cover is also pierced by an opening provided with a bushing 23, through which the polymerizable liquid and any auxiliary ingredient may be introduced into the kettle.

Within the kettle 10, for the purpose of homogenizing the contents thereof, is an agitator made up of a perforated disk 24, vanes 25, 25 and a shaft 26. The disk 24 is shaped in conformity to the floor of the kettle 10, and the agitator is so mounted and operated, as hereinafter fully described, that at its lowest operating position the disk 24 approaches within about 0.25 inch of the floor of the kettle. The vanes 25, 25 may be four in number, of which two are shown in the drawing. The radius of the agitator, i. e., of the system of perforated disk 24 and vanes 25, 25, is within about 0.25 inch of the inside radius of the kettle 10. The agitator is fitted thus closely to the kettle in order to prevent the liquid undergoing polymerization from building up in thick viscous layers upon the surface of the kettle and, also, to promote the sensitivity of the control exercised by the equipment. The walls of the kettle 10 should be vertical so that the clearance between agitator and walls shall be the same at any vertical position of the agitator.

In operation, the agitator has simultaneously a reciprocating vertical motion and a continuous rotational motion. To provide rotational motion, there is attached to the shaft 26 of the agitator a sheave 27, adapted to be driven by a belt from a source of power not shown in the drawing. The system of shaft 26 and sheave 27 is held in position against the side thrust of the belt by bearings 28, 28 placed, conveniently, one below and one above the sheave 27. These bearings 28, 28 are spaced apart sufficiently not to interfere with the reciprocating vertical movement of the shaft 26 as described hereinafter. The shaft 26 terminates in a swivel joint made up of the member 29, attached rigidly to the shaft 26, and the member 30, which supports the member 29, and within which the member 29 is free to rotate. The member 30 terminates in a lug 31 drilled out to receive a bolt 32.

By means of upward and downward thrusts upon the lug 31 a vertical reciprocating motion can be imparted to the agitator system below. This motion is imparted by means of a compressible link member made up of two flat bars 33, 33 connected to the lug 31 by means of the bolt 32 and held in spaced relationship by bolts 34, 34, and a bar 35 placed between the bars 33, 33 and capable of a limited longitudinal motion with respect thereto. The bar 35 is provided with slots 36, 36 through which pass the bolts 34, 34 which hold in spaced relationship the bars 33, 33, and the amplitude of the motion of the bar 35 with respect to the bars 33, 33 is limited by the amount of the excess in vertical height of these slots 36, 36 over the diameter of the bolts 34, 34. Alternatively, it may be limited by a shoulder or other stop on one or both of the bars 33, as at 37.

As a result of this construction, the weight of that part of the agitator system comprising the shaft 26, disk 24, vanes 25, 25, sheave 27, swivel members 29, 30, bolt 32 and bars 33, 33 is held suspended by the bolts 34, 34. Accordingly, when the kettle 10 is empty, the weight of the suspended components of the agitator system causes the bars 33, 33 to take the lowest possible position with respect to the bar 35, and, when the bar 35 is actuated into vertical reciprocating motion, by means not shown in the drawing, the whole agitator system follows completely this vertical reciprocating motion, and there is no relative motion between the bar 35 and the bars 33, 33. When, however, there exists within the kettle 10 a resistance against the downward travel of the agitator disk 24, sufficient to buoy up the weight of the suspended components of the system, a slippage takes place between the bar 35 and the bars 33, 33, whereby the latter are caused to rise with respect to the former within the limitation already mentioned. For the purpose of signaling the existence of such a resistance within the kettle 10, there is provided an alarm mechanism which is actuated by the relative motion between the bar 35 and the bars 33, 33.

In the embodiment shown in the drawing, the alarm mechanism comprises a fixed electrical contact surface 38, attached by a bracket 39 to one of the bars 33, and a movable electrical contact 40 attached to a lever 41 pivoted upon the other bar 33 and provided with a hole through which passes a pin 42 attached to the bar 35. Downward motion of the bar 35 with respect to the bars 33, 33 lowers the movable electrical contact point 40 to make contact with the fixed contact surface 38 and thereby closes an electrical circuit so as to actuate an alarm bell, or to operate a light signal, or the like.

In order to prevent loss of material from within the kettle 10 by volatilization and in order to prevent contamination of the contents of the kettle 10 by oil or atmospheric dust, a suitable seal or stuffing box must be provided where the shaft 26 of the agitator passes through the cover 11. Satisfactory from these standpoints, if no appreciable pressure is developed within the kettle, is a mercury seal such as is indicated in the drawing. This consists of suitable lengths of tubing 43, 44, which together with an annular plate 45 form an annular trough containing mercury 46. To the shaft 26 is fastened an inverted cup 47 which dips into the mercury 46 and thereby seals the opening between the shaft 26 and the tubing 43.

The vertical dimensions of the parts of this seal must be sufficient to maintain the seal at all vertical positions of the agitator. Also, in order to permit of the unimpeded vertical reciprocating motion of desired amplitude, the shaft 26 must be long enough, in its several portions, to provide clearance between the cup member 47 (in its topmost position) and the lower bearing 28, between the sheave 27 (in its lowest position) and the lower bearing 28, between the sheave 27 (in its highest position) and the upper bearing 28, and between the swivel member 30 (in its lowest position) and the upper bearing 28.

The vertical reciprocating motion may be imparted to the agitator by any conventional means. Thus the rod 35 may be pinned to a crank shaft which is actuated by an eccentric, which provides the desired reciprocating motion and at the same time serves to support the whole agitator system from above. The kettle itself is of course supported in fixed position, by means not shown in the drawing. Likewise the bearings 28, 28 are fixed to suitable supports. Conveniently, a suitable framework supports, in their respective appropriate fixed positions, the kettle 10, the bearings 28, 28, the mechanism which supports and actuates the agitator system, and the mechanism which, through a belt, actuates the sheave 27.

The operation of the equipment will be described with reference to the partial polymerization of methyl methacrylate, which is a substance typical of those for which the equipment is adapted.

Monomeric methyl methacrylate, together with plasticizer if that be required, is introduced into the kettle 10 through the opening at 23, and this opening together with that at 22 is then closed by means not indicated in the drawing. Water at a temperature of about 65° C. is circulated through the jacket 17 from the intake at 18 to the outlet at 19, and the polymerizable liquid is thereby heated to induce its polymerization.

It has been found preferable, during the polymerization, to operate the agitator intermittently rather than continuously, since continuous agitation appears to retard polymerization. Accordingly, it is preferred to have the operation controlled by a time mechanism so that the agitator is in motion for, say, 15 seconds and then stationary for, say, 5 minutes.

The motion of the agitator is a combination of vertical reciprocating motion with one of rotation, whereby respectively the perforated disk 24 and vanes 25, 25 are brought into action to keep the liquid homogeneous. The mobility of the monomeric methyl methacrylate is such, and the weight of the agitator system hanging upon the bar 35 is sufficiently great, so that there is during the early stages of the process no effective resistance offered to the successive downward strokes of the disk 24 of the agitator, and consequently no relative motion between the rods 33, 33 and the rod 35.

As polymerization progresses, however, the viscosity of the methyl methacrylate increases, and with it the resistance of the liquid to the vertical reciprocating motion of the perforated disk 24, until the resistance offered by the viscous syrup becomes sufficiently great so that the disk 24, being buoyed by this resistance, fails to drop to its initial lowest position, and there is a corresponding relative motion of the rods 33, 33 vertically upward with respect to the rod 35. This has the result of bringing the contact point 40 down until ultimately it touches the contact surface 38 on each stroke. There is thus signalled to the operator the fact that a certain viscosity has been reached.

In order to utilize this signal as a means of control of viscosity to a desired end-point, it is necessary merely that the equipment be so adjusted that the signal is given when the desired viscosity has been built up. Obviously such calibration of the equipment can be accomplished in various ways.

In the event that the design of the equipment and the speed of reciprocating motion are such that the alarm is actuated before the desired viscosity has been reached, correction can be made by reducing the speed of the reciprocating motion or by increasing the weight of the dependent parts of the agitator mechanism. If, on the other hand, the signal is not actuated until the contents of the kettle have reached too high a viscosity, adjustments in the opposite sense can be made.

Once the equipment has been calibrated to give the alarm when a desired viscosity has been reached, the operating procedure involves merely continuing the heating of the monomer until the alarm is given on several successive strokes. Then the circulation of hot water in the jacket 17 is replaced by circulation of cold water in order to stop the reaction of polymerization, and finally the kettle is drained through the discharge pipe 16. During the cooling of the batch the agitator is kept in operation, so that the cooling may be accomplished as rapidly and effectively as possible. At this stage there may be added any auxiliary ingredients—plasticizer, catalyst, dyestuff, etc.—which may not have been added previously.

The rate of the reciprocating motion may be of the order of 20 to 60 cycles per minute.

This vertical reciprocating motion of a perforated plate is of itself adequate to maintain substantial uniformity of viscosity in all parts of the liquid throughout the process of polymerization to a syrup. Accordingly, the rotational motion, and the vanes, which as agitating members are actuated thereby, can be omitted without making the equipment inoperative as a means of bringing the viscosity to a desired point. The rotating vanes are desirable, however, as aids to homogenization of the charge if the ingredients thereof are added separately to the kettle. In particular, the rotating vanes are needed to supplement the reciprocating perforated plate as a means of distributing any added ingredient. The speed of rotational motion may conveniently be of the order of 2 to 15 revolutions per minute.

It will be obvious that other modifications of the equipment will lie within the scope of the invention as defined in the claim.

The design and construction at the point where the shaft passes through the cover may, for instance, be altered. Such alteration will be necessary, in fact, if provision is to be made for the use of gaseous pressure within the kettle to hasten the discharge therefrom of the viscous syrup produced. The simple mercury seal illustrated in the drawing would obviously not retain any appreciable increase of pressure within the kettle. The design of any other seal or stuffing box must, of course, provide against the contamination of the contents of the kettle by lubricant or by refluxed monomer.

The term "compressible link member" has been used in the foregoing description to designate a member comprising bars fastened together in such manner as to be capable of longitudinal motion with respect to each other, with the result that the member as a whole is capable of being shortened by longitudinal compression, i. e., by the combination of a downward thrust upon its upper end and an upward thrust upon its lower end. Obviously, this particular construction of the member is not essential, and the term "compressible link member" is accordingly to be understood as including generally any mechanically equivalent member which has a definite fixed length so long as it is under the tension provided by the weight of the suspended components of the agitator system, but which is capable of being shortened by the compression provided by the buoyant effect of the liquid below upon these suspended components.

Thus the compressible link member may comprise a spring of such stiffness that it will become appreciably compressed only when the viscosity of the liquid in the kettle reaches a certain point, at which time the relative motion between the two ends of the spring is adapted to actuate an alarm. With this construction a further means of calibration is available, in that the amount by which the spring is compressed depends directly upon the viscosity so that it becomes feasible by adjustment of the distance between the contact surfaces of the alarm circuit to set the latter to respond at a predetermined viscosity.

Alternatively, the compressible link member may comprise a closed bellows which functions as a spring. With this still another means of calibration and control is available, in that the ease with which the bellows may be compressed by a given amount can be decreased by increasing the pressure of a gas within it.

The joint between the rotating and the non-rotating portions of the agitator mechanism may take other forms than the simple one shown in the drawing.

The alarm mechanism, actuated by differential motion within the compressible link member, may take the form of a simple bell and striker. The alarm mechanism may, as already mentioned, comprise means of adjustment so that a lesser or greater amplitude of relative motion between the parts of the compressible link member will be required to actuate it. This refinement is, however, not always necessary. In the compressible link member pictured in the drawing, the extent of the relative motion is only a small fraction of an inch and it has been found that it is easy to proportion the weight of the suspended parts of the agitator mechanism and the horizontal area of the face of the agitator plate so that no relative motion within the compressible link member takes place until the contents of the kettle have reached the desired viscosity, at which time the buoyant effect of the contents upon the agitator plate becomes sufficient to shorten the link member to the full extent and, in so doing, to actuate the alarm.

It will be evident that the provision of rather narrow clearance between the periphery of the agitator disk and the walls of the vessel will contribute materially to the resistance offered by the liquid contents of the vessel to the vertical motion of the agitator. The number and diameter of the perforations in the disk will likewise be a factor therein.

Obviously, the provision of an electrical impulse, which in the embodiment of the invention illustrated in the drawing has been stated to serve to sound an alarm bell, or otherwise to signal the desired end-point, can, if desired, be utilized to effect automatic control of the operation by actuating valves to replace the circulating warm water in the jacket by circulating cold water.

While the present apparatus has been described and the electrical contact device illustrated in the drawing with the purpose of having the signaling device actuated due to the resistance of the agitator in passing down through the polymerizing liquid on its downward stroke, it will be understood that the invention fully contemplates within its scope the reverse arrangement of the parts so that resistance of the viscous liquid to the agitator on its upward stroke actuates the signaling device. This would not be possible with the preferred compressible link illustrated in the drawing but, if a spring or bellows member were substituted therefor, it would be an obvious equivalent arrangement. That is, the bellows member or spring could be readily calibrated so that, with the upward stroke of the agitator, the resistance of the viscous liquid would distend the spring or bellows member sufficiently to actuate the signaling device.

An advantage of the apparatus of the present invention is that it provides an efficient means for thoroughly agitating a polymerizing liquid and thereby preventing local overheating and loss of control of the polymerization reaction. A further and important advantage of the apparatus is that it provides a simple automatic means of polymerizing a monomeric liquid to an exact predetermined viscosity.

As many apparently widely different embodiments of this invention may be made without departing from the spirit and scope thereof, it is to be understood that the invention is not limited to the specific embodiments thereof except as defined in the appended claim.

We claim:

An apparatus for the partial polymerization of a mobile monomeric liquid to the condition of a viscous syrup, which comprises a reaction vessel, a support for an agitator, an agitator within said vessel and hanging freely from said support, means for imparting vertical reciprocating motion to said support, and a signaling device adapted to be actuated by relative motion between said agitator and said support on the downward stroke of said support, resulting from the resistance of a liquid of predetermined viscosity in said vessel to the downward travel of said agitator.

CHARLES M. FIELDS.
REUBEN T. FIELDS.